United States Patent [19]

Morizane et al.

[11] Patent Number: 4,985,306

[45] Date of Patent: Jan. 15, 1991

[54] BASE PLATE FOR RECORDING DISC AND A METHOD FOR ITS MANUFACTURE

[76] Inventors: Toshinori Morizane, 26-12, Hazawa 2-chome, Nerima-ku, Tokyo; Tadao Tokushima, 18-1, Izumi 1-chome, Hamamatsu-shi, Shizuoka-ken, both of Japan

[21] Appl. No.: 462,381

[22] Filed: Jan. 9, 1990

[30] Foreign Application Priority Data

Feb. 16, 1989 [JP] Japan .................................. 1-37060

[51] Int. Cl.$^5$ .................. B44C 1/22; C03C 15/00; C03C 25/06; B32B 17/00
[52] U.S. Cl. .................................... 428/410; 156/628; 156/645; 156/654; 156/663; 65/31; 252/79.2; 360/135; 427/129; 428/156
[58] Field of Search ................. 65/31; 252/79.2, 79.3; 360/135; 428/156, 167, 170, 210, 900, 409, 410; 427/129; 156/628, 645, 654, 657, 663, 667

[56] References Cited

U.S. PATENT DOCUMENTS

| | | | |
|---|---|---|---|
| 3,976,523 | 8/1976 | Andreeva et al. | 156/663 X |
| 4,725,375 | 2/1988 | Fujii et al. | 252/79.2 X |
| 4,797,316 | 1/1989 | Hecq et al. | 65/31 X |
| 4,859,505 | 8/1989 | Nakayama et al. | 156/663 X |

*Primary Examiner*—William A. Powell
*Attorney, Agent, or Firm*—Armstrong, Nikaido, Marmelstein, Kubovcik & Murray

[57] ABSTRACT

Herein disclosed is a method for manufacturing a base plate for a recording disc, which comprises steps of: subjecting a base plate containing therein $SiO_2$-$Li_2O$-$Al_2O_3$ series crystallized glass to crystallizing treatment; then polishing the surface of said base plate; and thereafter subjecting the base plate to etching treatment with use of etching agents having different rates of etching between the crystallized layer and the amorphous layer, and also a base plate for a recording disc which is produced by the method as described above.

6 Claims, 3 Drawing Sheets

$Ra = 93 \overset{\circ}{A}$ $\vdash$ 1 $\mu$m $\dashv$

F I G. 1
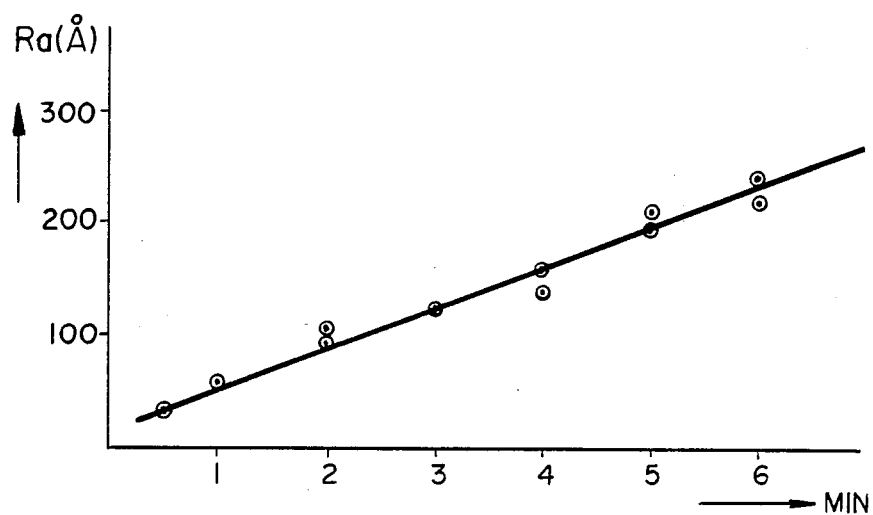
F I G. 2
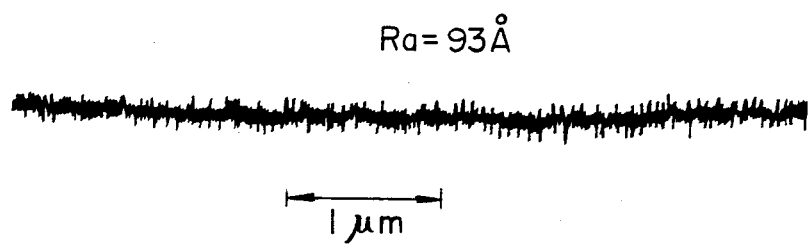

BASE PLATE FOR RECORDING DISC AND A METHOD FOR ITS MANUFACTURE

BACKGROUND OF THE INVENTION (a) Field of the Invention

This invention relates to a base plate to be used as a recording disc, on which a recording medium is to be maintained. More particularly, it is concerned with a method for manufacturing a glass base plate for disc to hold thereon a high density recording medium such as magnetic recording medium, etc., and also to such base plate for the recording disc.

(b) Description of Prior Arts

In the field of magnetic recording, a hard magnetic disc having high recording density comprises a base plate with a flat and smooth surface, and a recording medium of highly saturated magnetic density, for example, a magnetic metal thin film such as Co-Cr, Co-Ni, etc., placed on the base plate. This type of recording disc has its own problem such that, since its surface is extremely flat and smooth, there takes place adsorption between the magnetic head and the recording medium due to intervention of moisture in the air to result in crush of the magnetic head. With a view to solving this problem of head crush or "micro-tribology", there have so far been adopted various methods for lowering the frictional coefficient of the disc surface, such as slightly oxidizing the surface of a magnetic thin film of, for example, Co-Cr; or placing a solid lubricating material (e.g., carbon film) or a liquid lubricant on the surface on the base plate; or increasing surface coarseness of the base plate by subjecting it to a texturing treatment (a treatment to increase the surface coarseness of the base plate) through tape lapping or polishing. Such treatments are generally called "mechanical texturing".

The above mentioned mechanical texturing, however, has its disadvantage such that, due to occurrence of burns, etc., or irregular surface conditions, etc., there is a large partial differene in the surface coarseness (Ra) of the base plate with the consequence that it is easily scratched during sliding of a magnetic head on it. On account of such large difference in the surface coarseness, it is not possible to bring the magnetic head sufficiently close to the magnetic recording medium, which not only makes it difficult to realize the low bouyancy of the magnetic head required for effecting the high density recording, but also poses a problem on its CCS-resistant property. As an expedient for solving such problems, it has been admitted that the chemical texturing treatment, as disclosed in Japanese Patent Application No. 62-243074 is useful. The base plate for the disc, which has been subjected to this treatment is very small in variations of frictional coefficient due to continuous sliding of the magnetic head.

The present invention proposes an improved texturing technique, by which the surface of crystallized glass used as the base plate for the disc is subjected to an etching treatment to form uniform and regular convexities and concavities on the surface of the glass base plate.

SUMMARY OF THE INVENTION

It is therefore an object of the present invention to provide an improved method for manufacturing a base plate for a recording disc, from which the abovementioned problems have been removed.

It is also another object of the present invention to provide a base plate for a recording disc free from such disadvantages, as manufactured by the method.

According to the present invention, in one aspect of it, there is provided a method for manufacturing a base plate for a recording disc, which comprises the steps of: subjecting a base plate containing therein $SiO_2$-$Li_2O$-$Al_2O_3$ series crystallized glass to crystallizing treatment; then, polishing the surface of the base plate; and thereafter subjecting the base plate to etching treatment with use of etchants having different rates of etching between the crystallized layer and the amorphous layer.

According to the present invention, in another aspect of it, there is provided a base plate for a recording disc which is produced by the method as described above.

According to the present invention, in other aspect of it, there is provided a removing agent of a magnetic metal thin film which consists essentially of ammon ceric sulfate, perchloric acid, and water.

The foregoing objects, other objects as well as specific composition of the base plate for the recording disc, its treatment conditions, the etching agents to be used for this purpose, and so forth according to the present invention will become more apparent and understandable from the following detailed description thereof, when read in conjunction with the accompanying drawing showing the measured results of the preferred examples thereof.

BRIEF DESCRIPTION OF THE ACCOMPANYING DRAWING

In the drawing:

FIGS. 1, 3, 4 and 5 are respectively graphical representations showing a relationship between the etching time and the surface coarseness (Ra) of the base plate according to the preferred examples of the present invention; and FIG. 2 and 6 are respectively measured diagrams of the surface coarseness of the base plate manufactured by the preferred examples of the present invention.

DETAILED DESCRIPTION OF PREFERRED EMBODIMENTS

Figure 3:
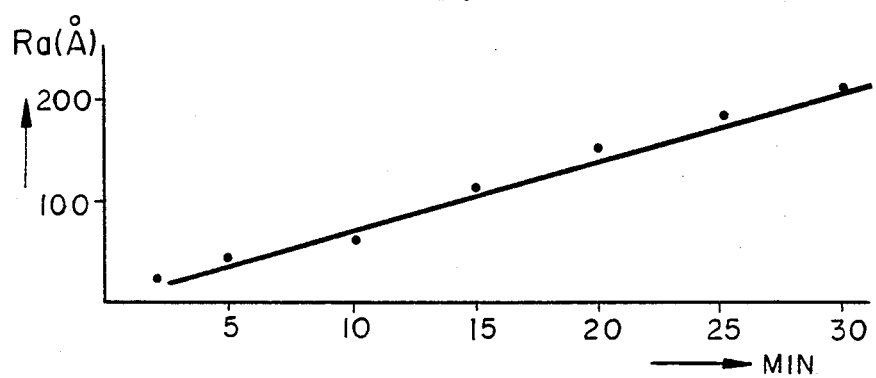
Figure 4:
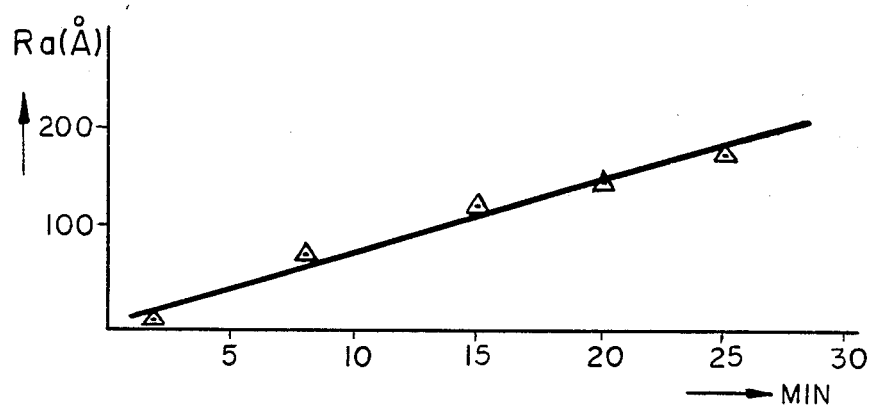

The present invention is directed to a method for producing the base plate for a recording disc, containing therein crystallized glass of $SiO_2$-$Li_2O$-$Al_2O_3$ series, wherein the surface of the base plate is polished after crystallization of the entire base plate and then etched with etching agents having different rates of etching between the crystallized layer and the amorphous layer in the base plate.

The base plate for the magnetic disc according to the present invention, containing therein $SiO_2$-$Li_2O$-$Al_2O_3$ series glass, is first subjected to heat-treatment, or photosensitive treatment, or both treatments to thereby deposit micro-crystals (primary crystallization), after which the crystallized state is adjusted under predetermined conditions (secondary crystallization). The principal crystal phase consists of $Li_2O.2SiO_2$ as disclosed in Japanese Patent Application No. 60-210954. Depending upon the glass composition, the base plate may further contain therein α-cristabalite, β-spodumene, $Li_2O.2SiO_2$, willemanite, garnite, and so forth. In particular, when the glass composition contains willemanite and garnite, a favorable result can be obtained, if and when the base plate for the disc is required to have a wear-resistant property, because these substances are in the crystal form of high hardness. Content of the crystal layer should appropriately be from 65% to 90. The grain size and the inter-crystalline distance of these crystal grains can be controlled by various conditions such as the glass composition, the crystallizing treatment, and so on. The crystallized glass as treated is then subjected to surface polishing (to a surface coarseness (Ra) ranging from 15 Å to 50 Å). The microstructure of the surface thereof is such that very fine and uniform crystal grains are evenly distributed regularly and two-dimensionally in the amorphous layer.

When the surface of the abovementioned crystallized glass, which has been polished, is etched with use of etchants having different degrees of dissolution with respect to the crystal grains and the amorphours layer (for example, with use of an etching agent having a greater solubility with the amorphous layer than the crystal grains), the surface structure of the glass will be such that the crystal grains of a uniform size are evenly distributed in the amorphous layer in a convex shape. Height of the crystal grains in the convex shape, i.e., depth between the convexity and concavity (the surface roughness) of the crystallized glass can be controlled by appropriate setting of the concentration of the etching agent, the treatment temperature, treatment time, and so forth. While no treatment is required to harden the surface of the glass base plate, because of high hardness of the crystal grains, it may be recommendable, when the inter-crystalline distance is large, to apply to rigid coating material such as chromium, bismuth, silicon carbide, and so on to adjust the inter-crystalline distance. In this case, the rigid coating material grows into film following the convexity and concavity of the surface of the base plate, so that the two-dimensional micro-structure of the surface convexity and concavity of the base plate surface can be maintained as it is. The high density magnetic recording medium such as, for example, Co-Cr, Co-Ni, etc. is adhered onto the surface of the abovementioned disc base plate by the sputtering method or the plating method, onto which a protective film is further coated. In this way, the magnetic recording body, i.e., the magnetic disc is completed. Depending on necessity, it may be feasible to hold a liquid lubricant in the convex and concave portions on the surface of the magnetic disc. Since the base plate for the magnetic recording disc of the present invention has, on its surface, the abovementioned micro-structure, there is created turbulence of air (inflow of air from all directions) on the surface of the base plate due to its rotation, which constitutes bouyancy resistance to the magnetic head. On account of this turbulence of air, the magnetic head can be maintained with an extremely small clearance between it and the surface of the base plate without bringing about crushing of the magnetic head.

With a view to enabling those persons skilled in the art to put the present invention into practice, the following preferred example is presented. It should be noted, however, that this example is merely illustrative and not so restrictive, and that any changes and modifications may be made by those skilled artisans without departing from the spirit and scope of the invention as recited in the appended claims.

The composition of the crystallized glass used as the base plate was selected from those as disclosed in Japanese Laid-Open Patent Application No. 62-72547, which consisted of: 79.0% by weight of $SiO_2$, 15.0% by weight of $Li_2O$, 4.0% by weight of $Al_2O_3$, 2.0% by weight of $K_2O$, 2.0% by weight of $P_2O_5$, and 0.2% by weight of $As_2O_3$. The heating temperature for the final (secondary crystallization) treatment was 900° C. (90 mins.), and the linear expansion coefficient $\alpha_{100\ c-300\ c} = 116 \times 10^{-7}$ (deg$^{-1}$). It was found that the crystallized glass composition having 16% by weight or below of $Li_2O$ is preferable. The surface polishing after the crystallizing treatment should be finished to a value of difference of the surface coarseness (Ra) ranging from 15 Å to 50 Å. After washing this crystallized base plate, it was immersed in each of the following liquid chemicals, in the state of its undried condition, to subject it to the etching treatment.

EXAMPLE 1

The abovementioned crystallized glass was immersed in an etchant, placed in a Teflon carrier vessel and maintained at a normal temperature, which was prepared by mixing concentrated hydrofluoric acid, concentrated hydrogen peroxide, and water at a mixing ratio of 1:4:16 (% by volume), then it was subjected to ultrasonic cleaning in boiling water for a time period of from two to ten minutes, and the thus cleaned glass base plate was dried in isopropyl alcohol vapor or furon vapor. The surface coarseness (Ra) increased proportionally with respect to the etching time under the condition of the etching time ranging from one to ten minutes. While the surface coarseness (Ra) of up to and including 5,000 Å is possibly attained depending on the manner of the etching treatment, a practical base plate for the recording disc should preferably have its surface coarseness in a range of from 50 Å to 2,000 Å. Relationship between the etching time and the surface coarseness (Ra) is partially represented in FIG. 1 of the accompanying drawing, and a measured diagram of the surface coarseness (for an etching time of two minutes.) is shown in FIG. 2. As shown in FIG. 1, the etching time is in linear relationship with the surface coarseness (Ra), hence the schedule control of its manufacturing becomes very simple.

EXAMPLE 2

As the etchant, use was made of a mixture of concentrated nitric acid, concentrated hydrogen peroxide, and water at a mixing ratio of 1:2:7 (% by volume), into which the crystallized glass was immersed at a liquid temperature of 60° C. for a time period of from 3 to 30 minutes. The remaining process steps were the same as those in Example 1 above. In this example, the surface coarseness (Ra) could be adjusted in a range of from 50 Å to 500 Å. For higher surface coarseness, a longer etching time was required, which was therefore not practical. FIG. 3 illustrates a relationship between the etching time and the surface coarseness (Ra).

EXAMPLE 3

As the etching liquid, use was made of a mixture of concentrated ammonia water, concentrated hydrogen peroxide, and water at a mixing ratio of 1:2:12 (% by volume), into which the crystallized glass was immersed at a liquid temperature ranging from 60° to 70° C. for a time period of from 2 to 25 minutes. The practical Ra value in this example was in a range of from 50 Å to 1,000 Å.

Figure 5:
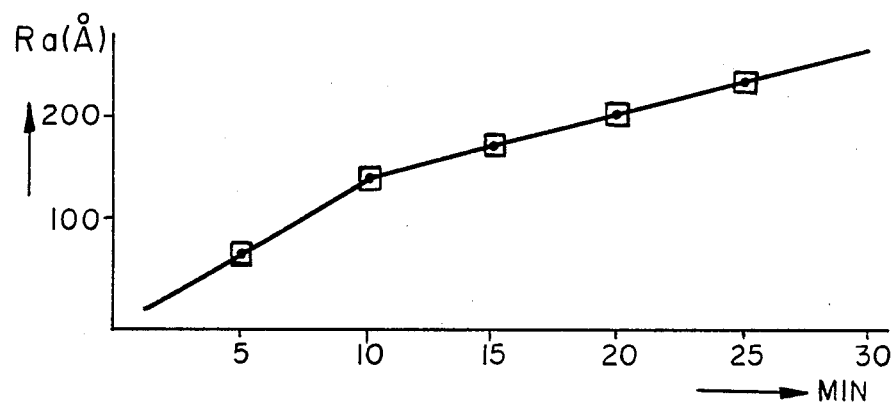

The surface structure (convexity and concavity) of the crystallized glass thus treated was found moderate in comparison with the case of Example 1 above, in connection with a same Ra value. This difference in the surface structure is considered due to a difference in the immersion time. FIG. 5 illustrates a relationship between the etching time and the surface coarseness (Ra).

EXAMPLE 4

Figure 6:
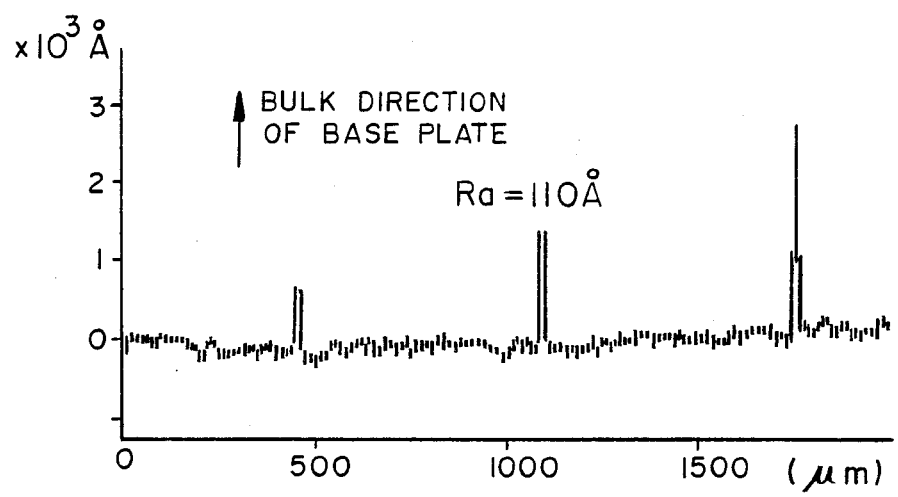

As the etching liquid, use was made of a mixture composed of 10 l of water, 300 g of ammon ceric sulfate, 200 g of perchloric acid, and 2 l of concentrated hydrogen peroxide, into which the crystallized glass was immersed at a liquid temperature of 40° C. for a time period of from 1 to 25 minutes. The practical Ra value in this example was in a range of from 50 Å to 1,00 Å. FIG. 6 illustrates a relationship between the etching time and the surface coarseness (Ra). The surface state of the crystallized glass in this example was substantially same as in Examples 2 and 3 above. The etching liquid used in this example was also shown to be effective for the removal of the magnetic film (immersion time of from 20 sec. to one minute). In this case, hydrogen peroxide is not always required.

EXAMPLE 5

As the etching liquid, use was made of a mixture composed of 1% by volume of hydrogen fluoride and 20% by volume of water, into which the crystallized glass was immersed for one minute. The surface coarseness (Ra) in this case was 110 Å.

Since the base plate for the recording disc of the present invention has the structure as mentioned in the foregoing, crystal grains of uniform size are evenly distributed on the surface of the base plate, on account of which it has become possible to solve the points of problem as have heretofore been experienced. Further, the grain size, inter-crystalline distance, depth of surface convexity and concavity, and others can be readily controlled by appropriate setting of the glass composition or the etching conditions, which facilitates the schedule control and the quality control, hence the method is best suited for the industrial mass production of the base plate.

What is claimed is:

1. A method for manufacturing a base plate for a recording disc, which comprises steps of:
    subjecting a base plate containing therein $SiO_2$-$Li_2O$-$Al_2O_3$ series crystallized glass to crystallizing treatment;
    polishing the surface of said base plate; and
    thereafter subjecting said base plate to etching treatment with use of etchants having different rates of etching between the crystallized layer and the amorphous layer.

2. A base plate for a recording disc obtained by the method of subjecting a base plate containing therein $SiO_2$-$Li_2O$-$Al_2O_3$ series crystallized glass to crystallizing treatment; polishing the surface of said base plate; thereafter subjecting said base plate to etching treatment with use of etchants having different rates of etching between the crystallized layer and the amorphous layer.

3. A base plate for a recording disc as set forth in claim 2, wherein said etchant contains therein hydrogen peroxide.

4. A base plate for a recording disc as set forth in claim 2, wherein depth of convexities and concavities on the surface of said base plate is in a range of from 50 Å to 2,000 Å.

5. A base plate for a recording disc as set forth in claim 2 or 3, wherein the surface of said base plate is coated with a rigid coating material.

6. A removing agent for a magnetic metal thin film which consists essentially of ammon ceric sulfate, perchloric acid, and water.

* * * * *